US012448257B2

(12) United States Patent
Brants et al.

(10) Patent No.: US 12,448,257 B2
(45) Date of Patent: Oct. 21, 2025

(54) DRUM SPOOLING SYSTEM WITH LOAD-BEARING LINE PROTECTIVE WRAP

(71) Applicant: Protech Theatrical Services, Inc., North Las Vegas, NV (US)

(72) Inventors: William H. Brants, Las Vegas, NV (US); Matthew B. Boswell, North Las Vegas, NV (US); Carroll R. Mayhew, North Las Vegas, NV (US)

( * ) Notice: Subject to any disclaimer, the term of this patent is extended or adjusted under 35 U.S.C. 154(b) by 277 days.

(21) Appl. No.: 18/129,828

(22) Filed: Mar. 31, 2023

(65) Prior Publication Data

US 2023/0373763 A1 Nov. 23, 2023

Related U.S. Application Data

(60) Provisional application No. 63/325,715, filed on Mar. 31, 2022.

(51) Int. Cl.
*B66D 1/28* (2006.01)
*B66D 1/26* (2006.01)
*B66D 1/60* (2006.01)

(52) U.S. Cl.
CPC ................. *B66D 1/28* (2013.01); *B66D 1/26* (2013.01); *B66D 1/60* (2013.01)

(58) Field of Classification Search
CPC ... B66D 1/26; B66D 1/28; B66D 1/54; B66D 1/60; A63J 1/02; A63J 1/028
See application file for complete search history.

(56) References Cited

U.S. PATENT DOCUMENTS 113,277 A * 4/1871 Dunne .................... A63J 1/028 472/78
8,544,823 B2 * 10/2013 Imberi ..................... B66D 1/12 254/338
8,720,811 B2 * 5/2014 Zink .................. B65H 75/4478 242/397.2
9,616,357 B2 * 4/2017 Sowka .................... A63J 1/028
2011/0127477 A1 * 6/2011 Kokolis ................... B66D 1/26 254/338

* cited by examiner

*Primary Examiner* — Anna M Momper
*Assistant Examiner* — Nathaniel L Adams
(74) *Attorney, Agent, or Firm* — Newman Law, LLC

(57) ABSTRACT

A drum spooling system with a line protective material or wrap that can be wound and unwound with a load-bearing line, such as a wire rope, on a load drum to form a superposed arrangement of layers of the load-bearing line and protective material around the load drum, which advantageously reduces the pressure on the drum, radial space and/or drum size requirements, and damage to the wire rope resulting from the spooling and unspooling process, among other things.

7 Claims, 3 Drawing Sheets

DRUM SPOOLING SYSTEM WITH LOAD-BEARING LINE PROTECTIVE WRAP

FIELD OF THE INVENTION

The invention is directed to a spooling system, and more particularly to a spooling system with storage drum for winding lines, such as cable, wire and rope, on a drum under high tension. Embodiments of the invention may be advantageously adapted for use with theatrical scenery.

BACKGROUND OF THE INVENTION

Line driven systems use cables, ropes or wires ("lines") of long length which are wound and unwound on a drum at high tension. A drum as used herein, which may also include a spool, bobbin or reel, is cylindrical in shape with an axial hole for receiving an axis or a spindle during winding or unwinding. Optionally there can be a rim or a ridge at one or both ends of the cylinder in order to enable the drum to hold more line.

In a typical application one end of the line is attached to the drum while the other end is attached to an object or load to be alternately lifted by the rotational motion of the drum which in turn winds and/or unwinds the line on the drum through the counterclockwise and clockwise rotation of the drum on the spindle. The line or multiple lines may be maintained in position by one or more grooved pulley wheels, often at high tension as a result of the weight of the load.

The line or multiple lines are spooled onto the drum in a manner in which the line or layer of lines are wound circumferentially on top of one another. Each layer of line is thus in direct contact with either one or both of an inner and outer layer, with the lines of each layer of line generally settling into grooves formed by adjacent lines in the radially inner or previously wound layer of line.

The action of winding and unwinding the line on the drum is a repetitive operation that can cause damage to the line. It should be readily apparent that a damaged line used for lifting heavy objects creates a substantial safety issue.

Accordingly, there is a need in the art for improved drum spooling systems for at least the foregoing reasons.

SUMMARY OF THE INVENTION

The invention is generally directed to addressing the issues cited above, among others, by providing a drum spooling system with a line protective layer that can be wound and unwound in contact with a load-bearing line, such as a wire rope.

Some embodiments of the invention are directed to a drum spooling system, comprising: a load drum mounted for rotational motion, the load drum being operatively associated with a motor for driving rotational motion thereof; a storage drum mounted for rotational motion; a load-bearing line having a first end engaged with the load drum, a second end attached to a load, and an intermediate section, the intermediate section being alternately spooled on the load drum and unspooled from the load drum responsive to alternating rotational motion of the load drum; and an protective wrap having a longitudinal groove defined therein, the protective wrap having a first end engaged with the storage drum, a second end engaged with the load drum, a first intermediate portion and a second intermediate portion, wherein responsive to alternating rotational motion of the load drum, the first intermediate portion is alternately spooled on the storage drum and unspooled from storage drum and the second intermediate portion is alternately spooled on the load drum and unspooled from the load drum simultaneously with the intermediate section being alternately spooled on the load drum and unspooled from the load drum, wherein the intermediate section of the load-bearing line is received in the longitudinal groove of the second intermediate portion responsive to the spooling of the intermediate section of the load-bearing line on the load drum.

In some embodiments, the protective wrap is constructed of a deformable material.

In some embodiments, the aforementioned system further comprises a plurality of load-bearing lines.

In some embodiments, the protective wrap further comprises a plurality of longitudinal grooves, wherein each longitudinal groove of the plurality of longitudinal grooves receives each load-bearing line of the plurality of load-bearing lines.

In some embodiments, the protective wrap further comprises a plurality of longitudinal grooves.

In some embodiments, the protective wrap further comprises a plurality of longitudinal grooves.

In some embodiments, the intermediate section of the load-bearing line and the load-bearing line are spooled onto the load drum at a first circumferential position and a second circumferential position, respectively, wherein the first circumferential position and the second circumferential position are from about 0 degrees to about 180 degrees apart.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another and vice versa. Furthermore, the elements may not be drawn to scale.

Various embodiments will hereinafter be described in accordance with the appended drawings, which are provided to illustrate, not limit, the scope, wherein similar designations denote similar elements, and in which.

DETAILED DESCRIPTION OF SOME EMBODIMENTS OF THE INVENTION

Figure 1:
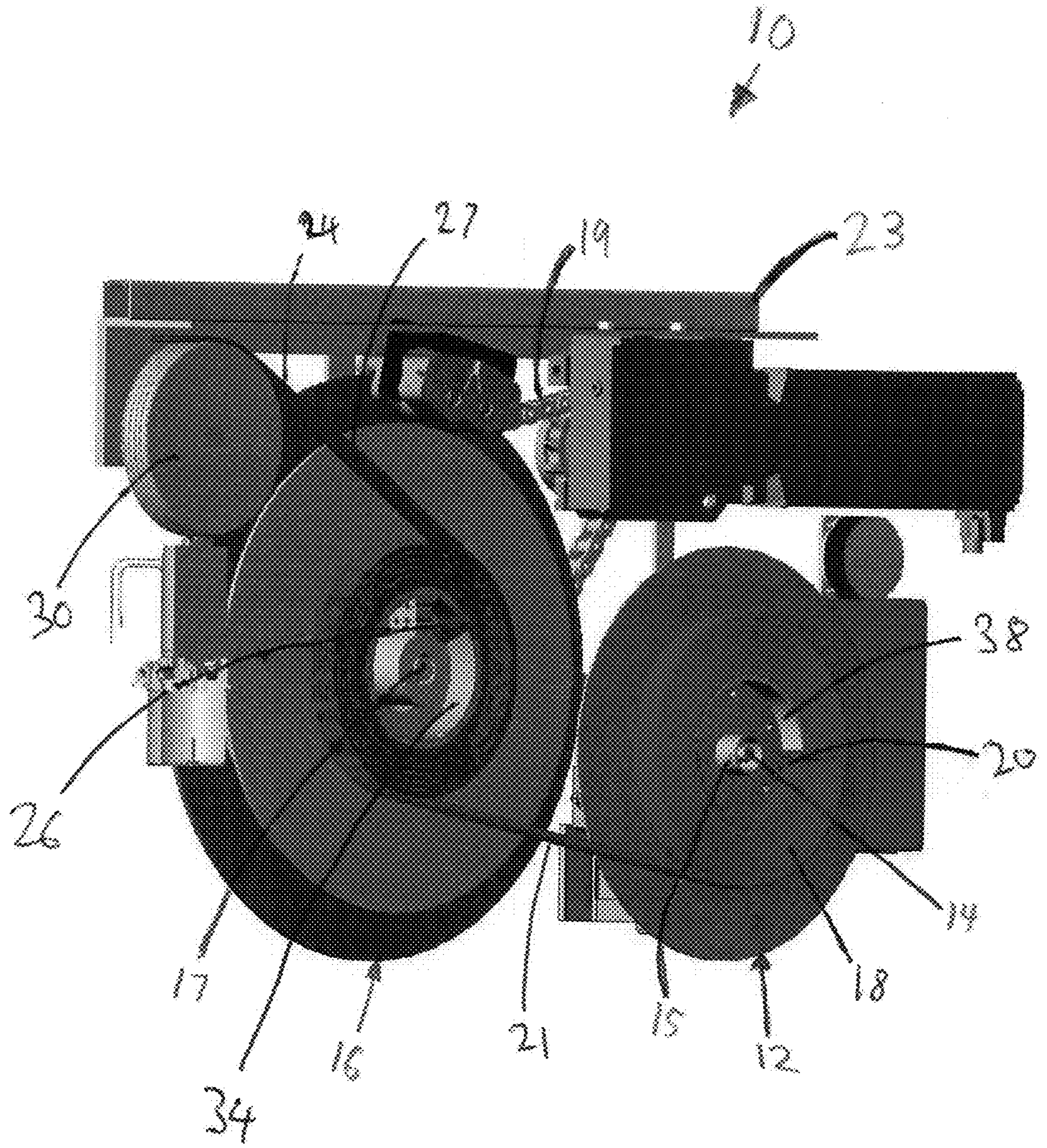
FIG. 1 is a front perspective schematic cross-sectional view of a drum spooling system with a load-bearing line protective layer configured and constructed according to some embodiments of the invention.

Detailed Description of Embodiments of the Invention

The present disclosure is best understood with reference to the figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Methods of the present invention may be implemented by performing or completing manually, automatically, or a combination thereof, selected steps or tasks. The term "method" refers to manners, means, techniques, and procedures for accomplishing a given task including, but not limited to, those manners, means, techniques, and procedures either known to or readily developed from known manners, means, techniques, and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

Embodiments of the invention disclosed herein are advantageously adapted to work with existing drum spooling systems. While the discussion and embodiments of the invention described herein is directed to such systems, it should be readily apparent that the same concepts of the invention discussed herein are also applicable to other applications and types of systems, and thus, the invention is not limited to any particular type of application or system.

Where certain elements of the disclosure can be partially or fully implemented using known components and processes, only those portions of such known components and processes that are helpful for providing an understanding of the embodiment of the invention disclosed are described, whereas detailed descriptions of other known components and processes are omitted so as not to obscure the invention. Furthermore, some components and processes have been omitted are shown unlabeled to illustrate certain elements of the invention and/or avoid obscuring certain elements of the invention that are described herein and depicted in the figures.

FIGS. 1-5 are directed to a system constructed or modified in accordance with some embodiments of the invention generally designated by the reference numeral 10. System 10 including a storage drum 12 having an arbor 15 mounted on a spindle 14 for rotational motion and a load drum 16 mounted for rotational motion on a spindle 17. Load drum 16 may be driven by a motorized mechanism 19. In some embodiments, storage drum 12 is mounted adjacent to a load drum 16 and may be mounted to a housing or frame 23.

A protective wrap 18 has a first end 20 secured or engaged to storage drum 12, a second end 22 secured or engaged to load drum 16, and an intermediate section 21 between first end 20 and second end 22. Intermediate section 21 is alternately spooled and unspooled from storage drum 12 and load drum 16 as load drum 16 alternately rotates in a clockwise or counterclockwise manner. In some embodiments, protective wrap 18 is an elongated line of material, and may be of any cross-sectional shape, such as circular, square or rectangular.

A load-bearing line 24 has a first end 26 secured or engaged to load drum 16 and a second end 28 attached to a load (not shown), and an intermediate section 27 between first end 26 and second end 28. Intermediate section 27 is alternately spooled and unspooled from load drum 16 as load drum 16 is alternately driven to rotate in a clockwise or counterclockwise manner by motorized mechanism 19. Load-bearing line 24 is typically, but not always, is attached to a load after line 24 passes over or through one or more guides, sheaves or pulleys, one of which is generally depicted by reference numeral 30.

System 10, storage drum 12 and load drum 16 are positioned and configured to enable load-bearing line 24 and protective wrap 18 to come into contact with one another while being wound on barrel 34 of load drum 16, whereby a superposed arrangement of load-bearing line 24 and protective wrap 18 is formed as shown by reference numeral 36.

As load drum 16 rotates to unspool or unwind load-bearing line 24, such as when a load at the end of line 24 is being lowered or moved with gravity or less resistance, load-bearing line 24 and protective wrap 18 separate with protective wrap 18, with protective wrap 18 being spooled or wound on barrel 38 of storage drum 12. As load drum 16 rotates in the opposing direction to wind load-bearing line 24 onto barrel 34 of load drum 16, such as when a load is being lifted or moved against gravity with greater resistance, protective wrap 18 is unwound from barrel 38 of storage drum 12 and directed (which may include one or more sheaves or guide members) into contact with load-bearing line 24 as they are wound onto barrel 34 load drum 16 in the superposed arrangement 36.

It should be understood that load drum 16 and storage drum 12 may be configured in a variety of positions relative to one another, and/or load-bearing line 24 and protective wrap 18 may be directed from multiple directions at various angles or degrees relative to one another based on the position of drum 16 and drum 12 and/or through the use of elements for directing line 24 and layer 18, such as guides, pulleys or sheaves, so long as load-bearing line 24 and protective wrap 18 are brought into contact with one another when being spooled onto load drum 16.

Figure 2:
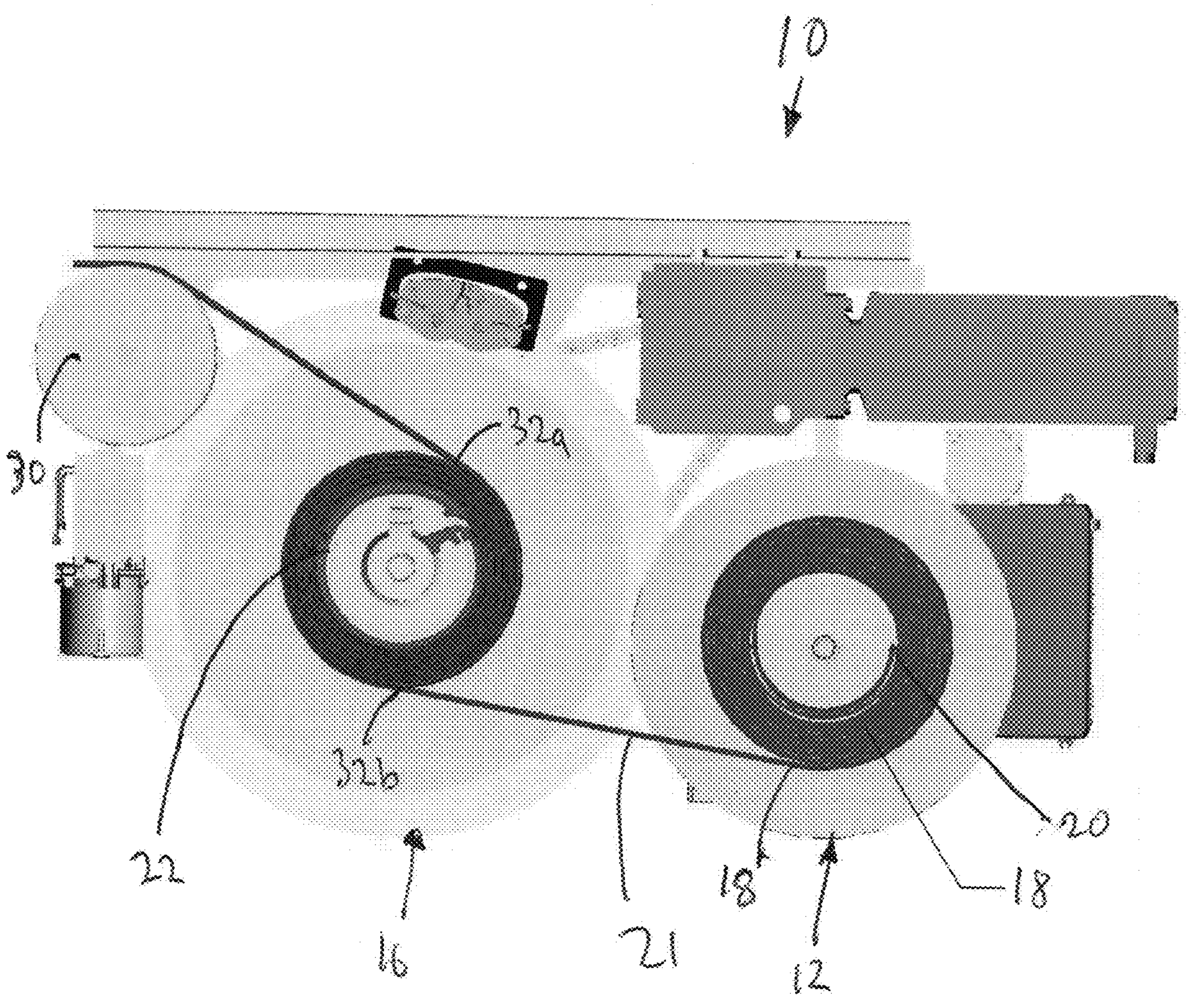
FIG. 2 is a side view of the drum spooling system shown in FIG. 1.
Figure 4:
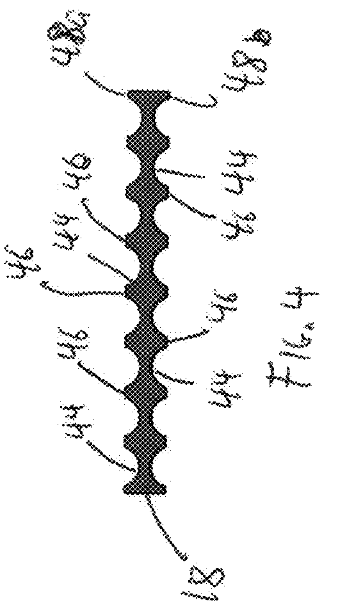
FIG. 4 is a cross-sectional view of the protective layer constructed in accordance with some embodiments of the invention taken along line 4-4 of FIG. 3.
Figure 3:
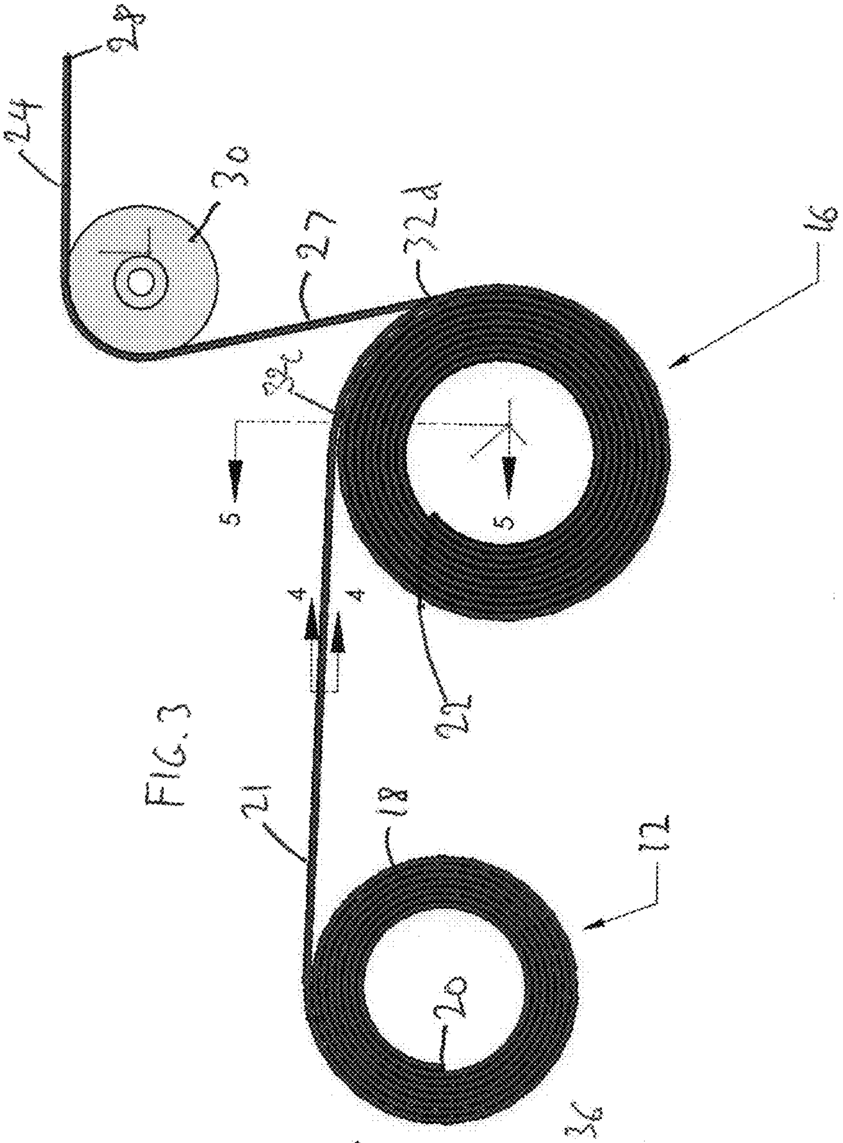
FIG. 3 is a schematic diagram of another configuration of a load-bearing line and protective layer system constructed in accordance with some embodiments of the invention.

For example, in FIGS. 1 and 2, load-bearing line 24 is directed to load drum 16 from an elevated position, and upon being spooled onto load drum 16, feeds first onto load drum 16 from the radially opposite side of protective wrap 18. Protective wrap 18, which is directed to load drum 16 from a lower elevation, then contacts load drum 16 and meets with load-bearing line 24 thereon at a position 32*a* which is about 180 degrees from the point 32*b* at which load-bearing line 24 contacts load drum 16. In another example shown in FIG. 3, load-bearing line 24 and protective wrap 18 are directed to load drum 16 from a similar radial side of load drum 16, with protective wrap 18 being wound onto load drum 16 first at a point 32*c* and within 90 degrees of the point 32*d* at which load-bearing line then meets with protective wrap 18 on load drum 16.

In the exemplary embodiment illustrated herein, protective wrap 18 is configured as an elongated generally planar strip of material having a longitudinal length equal or related to the length of a portion or the entirety of load-bearing line 24 and a width less than the lateral width of barrel 34 as also defined by opposing flanges 40 and 42 of load drum 16. The width of protective wrap 18 is also be less than the width of barrel 38 of storage drum 12 defined by its opposing flanges (not shown).

In some embodiments, protective wrap 18 has a corrugated configuration and includes upper and lower sides 48*a* and 48*b* with opposing sets of upper and lower longitudinal grooves 44 defining adjacent ridges 46. Each groove 44 and ridges 46 accommodates receiving load-bearing line 24 therein as line 24 and protective wrap 18 are wound together onto load drum 16.

In the embodiment shown herein, load-bearing line 24 comprises a plurality of load-bearing lines 24 with each line being laterally positioned, such that rotating drum 16 in alternating directions either winds or unwinds the plurality of load-bearing lines 24 simultaneously on barrel 34.

In this embodiment, protective wrap 18 is corrugated, that is, configured with a plurality of alternating adjacent grooves 44 and ridges 46. In some embodiments, protective wrap 18 has the same amount of laterally adjacent grooves 44 as the amount of laterally adjacent load-bearing lines 24, whereby each load-bearing line of the plurality of load bearing lines 24 is received by a groove 44 in protective wrap 18 as the plurality of laterally adjacent load-bearing lines 24 are wound on barrel 34 of load drum 16.

Figure 5:
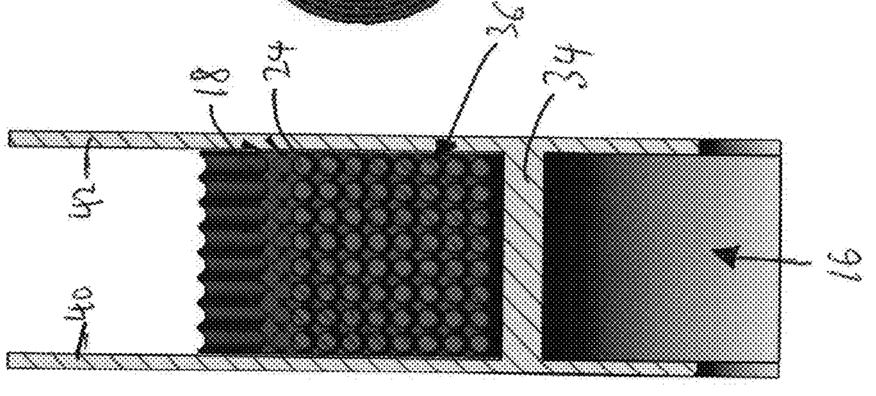
FIG. 5 is a cross-sectional view of the load drum taken along line 5-5 of FIG. 3 illustrating the superposed arrangement formed by spooling the load-bearing line and protective layer onto load drum in accordance with some embodiments of the invention.

In this embodiment, the lateral width of protective wrap 18 corresponds with the lateral with the lateral width of barrel 34 whereby protective wrap 18 is wrapped spirally and generally uniformly in a single layer about barrel 34 between flanges 40 and 42 as shown particularly in FIG. 5.

System 10 enables the plurality of laterally adjacent load-bearing lines 24 to be maintained in the same laterally adjacent positions with respect to each other when wound as when unwound, with each individual line being received within cooperating laterally adjacent grooves 44 of protective wrap 18 upon being would onto barrel 34 of load drum 16.

The superposed arrangement of line 24 with protective wrap 18 helps to, among other things, reduce the interlayer line pressure, particularly at the barrel 34 and/or core or arbor 15 of load drum 16 where pressure may be highest, and to conserve radial space (outwardly with respect to arbor 15) on load drum 16. The arrangement of lines 24 and protective wrap 18, among other things, also enables the radially outward or vertical stacking of lines 24 on load drum 16, with protective wrap 18 effectively filling in for the groove space which would naturally be formed between adjacently wound lines wrapped around a drum without protective wrap 18. Multiple layers of line 24 may thus be wound on a single load drum 16 using protective wrap 18 without damage caused by direct line-to-line contact.

In some embodiments, the inclusion of protective wrap 18 further enables the controlled expansion of the drum wrapping (i.e., the lines 24 plus protective wrap 18) to match the increase in diameter due to the previous layer of wrapping, thus eliminating crossover of lines 24 at the point of interference between successive layers of wrapping, among other things, in which the wrapping forms an Archimedean spiral.

In some embodiments where there is a single load-bearing line 24, and an protective wrap 18 having a plurality of grooves 44 and ridges 46, the line 24 may be wound laterally within grooves 44 crossing laterally from one longitudinal side of protective wrap 18 to the opposing longitudinal side, which among other things, conserves radial space on load drum 16.

Protective wrap 18 may be constructed of a variety of materials. In this embodiment, protective wrap 18 is formed of a resilient, deformable or elastic material, such as a foam or foam-rubber, latex or polyurethane or the like. Other materials such as elastomer materials that could be used or combined to form the protective wrap include natural rubber or synthetic based rubber such as styrene-butadiene rubber (SBR), butyl rubber (MR), chloroprene rubber (CR), nitril rubber (NBR) or high performance rubbers such as ethene-propene (EPM, EPDM) or high performance rubbers like silicon rubbers or urethane rubbers. Alternatively some thermoplastic polymers like polyolefins and thermoplastic polyurethanes could be used.

Storage drum 12 may be motorized or driven passively by the rotational motion of load drum 16, which is motorized.

An exemplary use of the system and methods of the invention is in theatrical rigging counterweight systems.

While exemplary apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth herein, in the claims and any equivalents thereto.

The invention claimed is:

1. A drum spooling system, comprising:

a) a load drum mounted for rotational motion, the load drum being operatively associated with a motor for driving rotational motion thereof;

b) a storage drum mounted for rotational motion;

c) a load-bearing line having a first end engaged with the load drum, a second end attached to a load, and an intermediate section, the intermediate section being alternately spooled on the load drum and unspooled from the load drum responsive to alternating rotational motion of the load drum; and d) an protective wrap having a longitudinal groove defined therein, the protective wrap having a first end engaged with the storage drum, a second end engaged with the load drum, a first intermediate portion and a second intermediate portion, wherein responsive to alternating rotational motion of the load drum, the first intermediate portion is alternately spooled on the storage drum and unspooled from storage drum and the second intermediate portion is alternately spooled on the load drum and unspooled from the load drum simultaneously with the intermediate section being alternately spooled on the load drum and unspooled from the load drum, wherein the intermediate section of the load-bearing line is received in the longitudinal groove of the second intermediate portion responsive to the spooling of the intermediate section of the load-bearing line on the load drum.

2. The drum spooling system of claim 1, wherein the protective wrap is constructed of a deformable material.

3. The drum spooling system of claim 1, further comprising a plurality of load-bearing lines.

4. The drum spooling system of claim 3, wherein the protective wrap further comprises a plurality of longitudinal grooves, wherein each longitudinal groove of the plurality of longitudinal grooves receives each load-bearing line of the plurality of load-bearing lines.

5. The drum spooling system of claim 3, wherein the protective wrap further comprises a plurality of longitudinal grooves.

6. The drum spooling system of claim 1, wherein the protective wrap further comprises a plurality of longitudinal grooves.

7. The drum spooling system of claim 1, wherein the intermediate section of the load-bearing line and the protective wrap are spooled onto the load drum at a first circumferential position and a second circumferential position, respectively, wherein the first circumferential position and the second circumferential position are from about 0 degrees to about 180 degrees apart.

* * * * *